United States Patent
Takasaki

(10) Patent No.: US 9,786,879 B2
(45) Date of Patent: Oct. 10, 2017

(54) BATTERY MODULE

(71) Applicant: SANYO ELECTRIC CO., LTD., Osaka (JP)

(72) Inventor: Hiroshi Takasaki, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 170 days.

(21) Appl. No.: 14/424,436

(22) PCT Filed: Sep. 27, 2012

(86) PCT No.: PCT/JP2012/006189
§ 371 (c)(1),
(2) Date: Feb. 26, 2015

(87) PCT Pub. No.: WO2014/049652
PCT Pub. Date: Apr. 3, 2014

(65) Prior Publication Data
US 2015/0263320 A1 Sep. 17, 2015

(51) Int. Cl.
*H01M 2/10* (2006.01)

(52) U.S. Cl.
CPC ......... *H01M 2/1077* (2013.01); *H01M 2/105* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2008/0003495 | A1* | 1/2008 | Shimizu | H01M 2/1077 429/99 |
| 2010/0104938 | A1* | 4/2010 | Hermann | H01M 2/1077 429/120 |
| 2010/0147488 | A1* | 6/2010 | Pierre | H01M 2/1077 165/47 |
| 2012/0231309 | A1* | 9/2012 | Itoi | H01M 2/1077 429/99 |

FOREIGN PATENT DOCUMENTS

| | | |
|---|---|---|
| JP | 2002-231322 A | 8/2002 |
| JP | 2003-045505 A | 2/2003 |
| JP | 2005285455 A | 10/2005 |
| JP | 2007-141511 A | 6/2007 |
| JP | 2008-047301 A | 2/2008 |
| JP | 2010-225337 A | 10/2010 |
| JP | 2011-171175 A | 9/2011 |
| WO | 2011/149075 A1 | 12/2011 |

OTHER PUBLICATIONS

International Search Report issued in International Application No. PCT/JP2012/006189 with Date of mailing Dec. 18, 2012, with English Translation.

* cited by examiner

*Primary Examiner* — Patrick Ryan
*Assistant Examiner* — Christopher Domone
(74) *Attorney, Agent, or Firm* — McDermott Will & Emery LLP

(57) ABSTRACT

A battery module includes a plurality of battery blocks formed by arranging a plurality of unit cells in each block; and a hollow spacer placed between two adjacent battery blocks. The accommodation member and the spacer may be made of the same metal material. The spacer may be formed to include an insulation member for insulating two joined battery blocks from each other.

4 Claims, 5 Drawing Sheets

500

BATTERY MODULE

RELATED APPLICATIONS

This application is a national phase of International Application No. PCT/JP2012/006189, filed on Sep. 27, 2012, the disclosure of which Application is incorporated by reference herein.

TECHNICAL FIELD

The present invention relates to a battery module provided with a plurality of battery blocks.

BACKGROUND ART

Recently, hybrid vehicles (HV), plog-in HVs (PHV), and electric vehicles (EV) have become popular. A key device mounted in these eco-friendly cars is a secondary battery. Nickel hydride batteries and lithium-ion batteries are most popular on-vehicle secondary batteries. It is expected that the popularity of lithium-ion batteries will be accelerated in the future because of high energy density and absence of memory effect.

Because on-vehicle secondary batteries can achieve high output and high capacity, a large number of unit cells are connected for use. Normally, on-vehicle secondary batteries are provided as battery packs in which a plurality of battery blocks are connected. A plurality of unit cells are arranged in each battery block. On-vehicle secondary batteries provide high output and clear high safety criteria so that a thermal process carries weight. In principle, secondary batteries in which lithium-ion batteries are used produce larger heat than other batteries.

[patent document 1] JP2007-141511
[patent document 2] JP2011-171175

Problem To Be Solved By The Invention

The present invention addresses this requirement and a purpose thereof is to provide a technology of achieving secondary battery packaging with high pyrogenic tolerance.

Means To Solve The Problem

To address the aforementioned issue, the battery module according to an embodiment of the present invention includes a plurality of battery blocks formed by arranging a plurality of unit cells in each block; and a hollow spacer placed between two adjacent battery blocks.

Advantage Of The Present Invention

The present invention realizes a secondary battery packaging with high pyrogenic tolerance.

Best Mode For Carrying Out The Invention

Figure 1A:
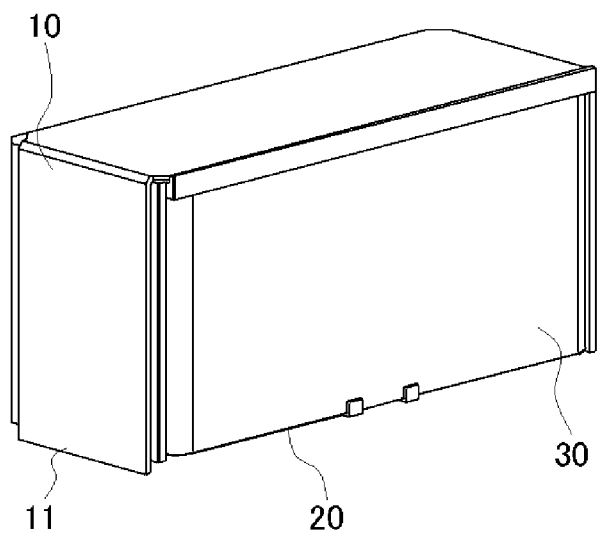
FIGS. 1A-1B are perspective views showing the configuration of a battery block according to a comparative example.
Figure 1B:
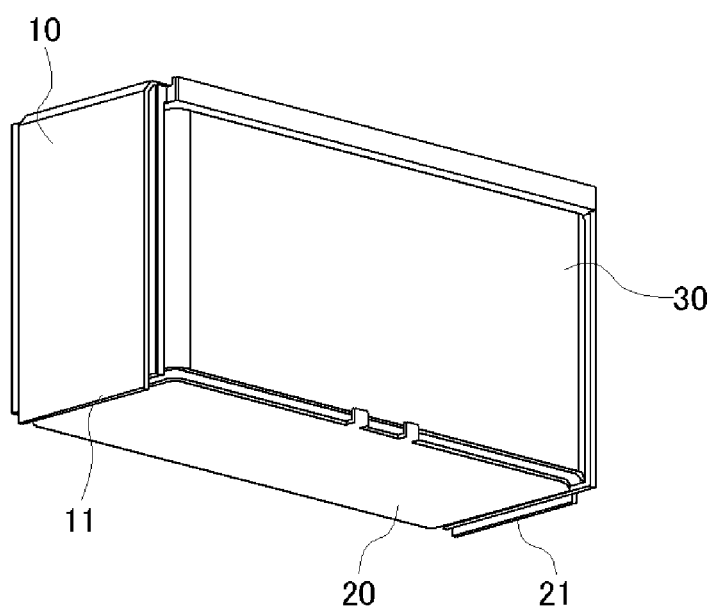

FIGS. 1A-1B are perspective views showing the configuration of a battery block 100 according to a comparative example. FIG. 1A is a perspective view from above and FIG. 1B is a perspective view from below. The battery block 100 is configured by arranging a plurality of unit cells (not shown) such that the positive electrodes face the same direction. A unit cell is a cylindrical secondary battery and a power generation unit is accommodated in a battery case. Each unit cell has a positive electrode and a negative electrode. FIGS. 1A-1B depict the positive electrodes of the unit cells facing upward.

A block case 30 is provided to cover the four outer lateral surfaces of the plurality of unit cells arranged in a hexagonal lattice. A positive electrode plate 10 covers the top surface on which the positive electrode ends of the plurality of unit cells are located. The positive electrode plate 10 is a member for electrically connecting the positive electrodes of the plurality of unit cells. Similarly, a negative electrode plate 20 covers the bottom surface on which the negative electrodes ends of the plurality of unit cells are located. The negative electrode plate 20 is a member for electrically connecting the negative electrodes of the plurality of unit cells. This establishes electrical parallel connection of the plurality of unit cells.

The positive electrode plate 10 is formed in an L-shape and is mounted on the part of the block case 30 covering the short-width lateral surface so as to extend over one of the two lateral surfaces (hereinafter, referred to as short-width lateral surface) of the four outer lateral surfaces with relatively smaller areas. The end of the positive electrode plate 10 covering the short-width lateral surface extends beyond the short-width lateral surface. The negative electrode plate 20 has a flange 21 opposite to an extension 11 of the positive electrode plate 10 so as to face the extension 11 of the positive electrode plate 10.

When a plurality of battery blocks as shown in FIGS. 1A-1B are connected to form a battery module, the battery blocks are joined such that the short-width lateral surfaces of the two adjacent battery blocks are in contact with each other. The extension 11 of the positive electrode plate 10 and the flange 21 of the negative electrode plate 20 are welded so that the two battery blocks are electrically connected in series. Three or more battery blocks can be joined using a similar joining method. The plurality of battery blocks connected in series as described above and another set of a plurality of battery blocks connected in series can be arranged such that their long-width lateral surfaces thereof are in contact with each other so as to form a two-dimensional array of battery blocks. In this process, series-parallel electrical connection can be established by connecting the electrodes at the ends of the two battery blocks in series connection, using a bus bar. Generally, the two-dimensional array of battery blocks described above are accommodated in a case so as to form a battery module.

Figure 2:
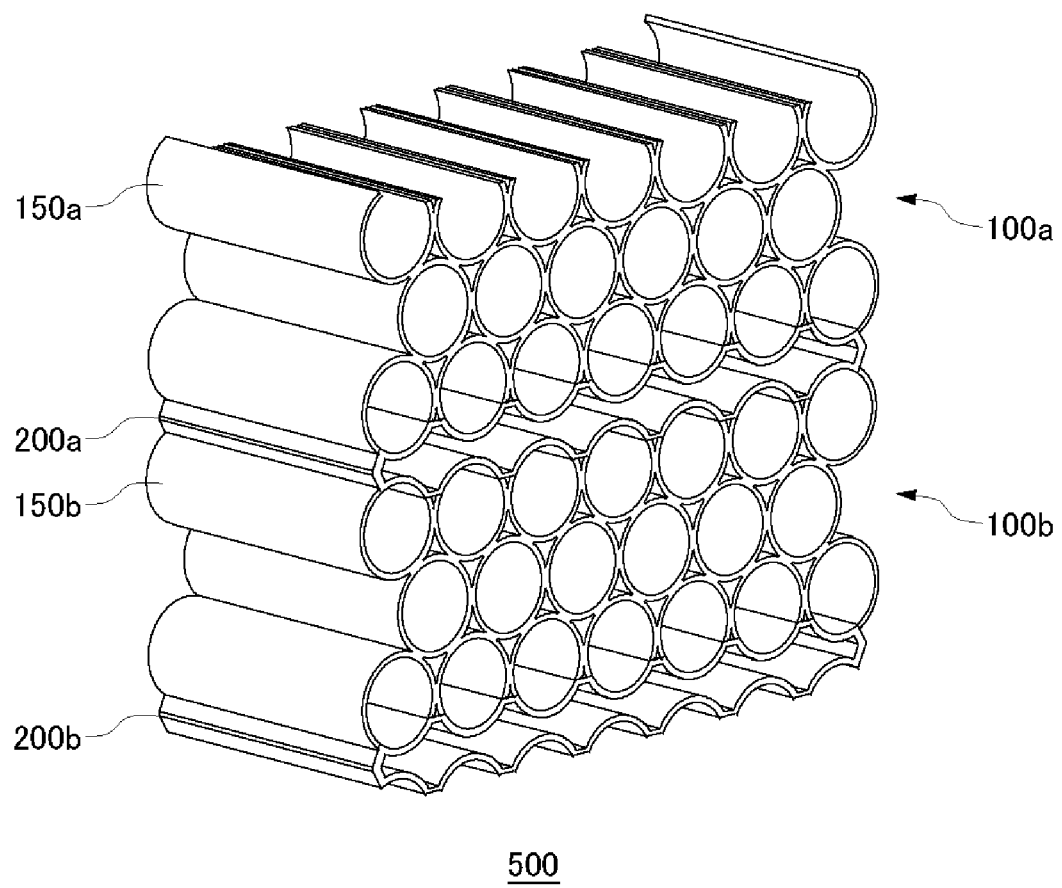
FIG. 2 is a perspective view showing the configuration of a battery module according to an embodiment of the present invention.
Figure 3:
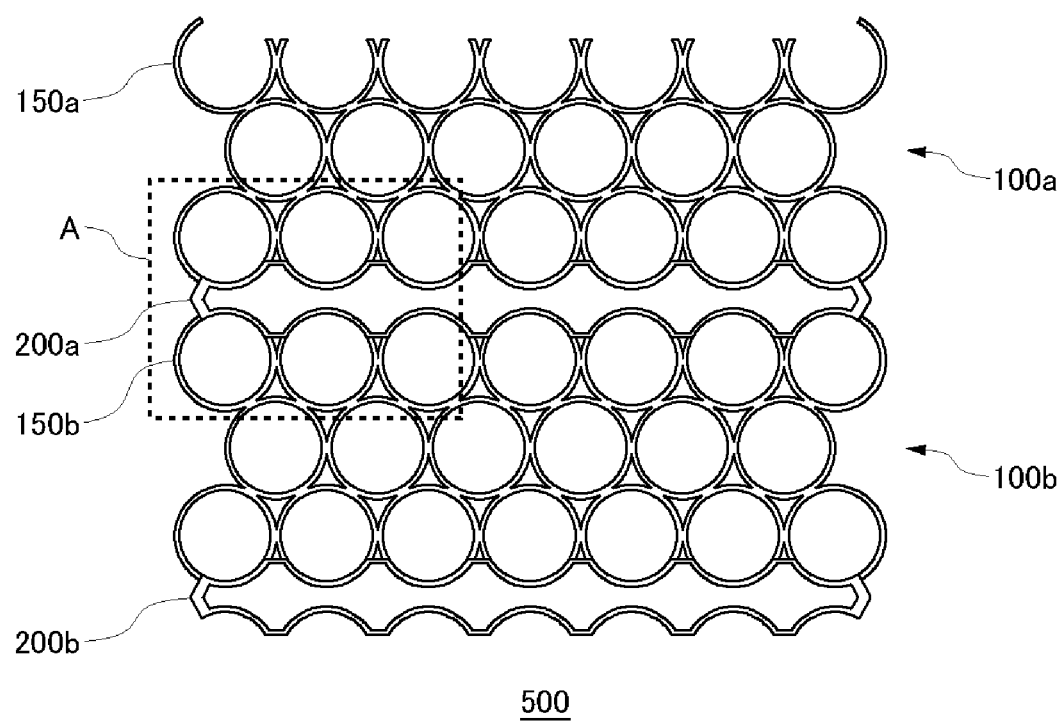
FIG. 3 a plan view showing the configuration of the battery module according to the embodiment of the present invention.

FIG. 2 is a perspective view showing the configuration of a battery module 500 according to an embodiment of the present invention. FIG. 3 a plan view showing the configuration of the battery module 500 according to the embodiment of the present invention. The battery module 500 according to the embodiment is configured such that a plurality of battery blocks 100 are joined using spacers 200. Referring to FIGS. 2 and 3, a first battery block 100a and a second battery block 100b are joined by a first spacer 200a. The figures show a second spacer 200b joined to the surface of the second battery block 100b opposite to the surface of joint with the first battery block 100a. If the number of battery blocks 100 forming the battery module 500 is 2, the second spacer 200b may be omitted.

Each battery block 100 is provided with an accommodation member 150. The plurality of cylindrical parts of the accommodation member 150 that respectively accommodate a plurality of columnar unit cells form a hexagonal lattice. Referring to FIGS. 2 and 3, the first battery block 100a has a first accommodation member 150a in which 20 cylindrical parts that accommodate 20 unit cells, respectively, form a hexagonal lattice. Like the first battery block 100a, the second battery block 100b also has a second accommodation member 150b. Constituting elements of the battery blocks 100 shown in FIGS. 2 and 3 other than the accommodation members 150 are omitted from the illustration. In other words, the unit cells, positive electrode plates, negative electrode plates, and other case members are omitted from the illustration.

On the lateral surfaces of the accommodation member 150 that should be joined to the spacer 200, a portion of the circumference of the cylindrical part is opened. Referring to FIGS. 2 and 3, a portion of the circumference of the cylindrical parts in the two outer rows of the three rows is opened. More specifically, the outer arc on the circumference is opened (at an angle of about 120°). The accommodation member 150 is made of metal. For example, the accommodation member 150 is made of aluminum or an alloy composed mainly of aluminum.

The spacer 200 is placed between adjacent battery blocks. The lateral surface of the spacer 200 is wave-shaped so as to define a portion of the circumference of the accommodation member 150 that is opened. The spacer 200 is a hollow member. A hollow is formed in a direction parallel to the direction of accommodating the unit cells in the accommodation member 150. The lateral surface of the spacer 200 in contact with the accommodation member 150 is formed with a recess of a shape corresponding to the opened outer arc of the cylindrical part of the accommodation member 150. In the example shown in FIGS. 2 and 3, seven recesses are formed in each lateral surface. The ends of the outer opened arc of each cylindrical part of the accommodation member 150 is welded to the ends of the associated recess formed on the lateral surface of the spacer 200 with the result that the cylindrical part is turned into a completely closed cylindrical part.

Preferably, the spacer 200 is made of the same material as the accommodation member 150. According to the embodiment, the accommodation member 150 and the spacer 200 are made of the same metal material (e.g., aluminum). The thickness of each cylindrical part of the accommodation member 150 is configured to be substantially identical to the thickness of the joint surface of the spacer 200 joined to the accommodation member 150. Preferably, the thickness of the two lateral surfaces of the spacer 200 joining the joint surfaces is designed to be thicker than the thickness of the joint surfaces.

Referring to FIGS. 2 and 3, the second spacer 200b is joined to the surface of the second battery block 100b opposite to the surface of joint to the first battery block 100a. By joining another battery block to the opposite joint surface of the second spacer 200b, an additional battery block can be joined. By joining the battery modules 500 shown in FIGS. 2 and 3, a new battery module 500 provided with four battery blocks can be produced.

The battery block 100 at the ends of the battery module 500 may be of a type in which the outer cylindrical part not joined to an adjacent block is not opened. Alternatively, a lid member (not shown) may be joined to cover the opened portion of the circumference.

The shape and position of installation of the positive electrode plate and the negative electrode plate provided in each battery block 100 constituting the battery module 500 are non-limiting in this embodiment. The requirement is that a parallel circuit may be formed by the 20 unit cells included in each battery block 100.

The battery blocks 100 constituting the battery module 500 may be arranged such that the polarities alternate. Given that the positive electrode of the unit cell of the first battery block 100a faces upward, the adjacent second battery block 100b may be arranged such that the negative electrode faces upward. In this case, the positive electrode plate of the first battery block 100a can be located on the same plane as the negative electrode plate of the second battery block 100b, and the negative electrode plate of the first battery block 100a can be located on the same plane as the positive electrode plate of the second battery bock 100b. Thus, by connecting the positive electrode plate with the negative electrode plate and connecting the negative electrode plate with the positive electrode plate, a series circuit comprising the first battery block 100a and the second battery block 100b can be easily formed.

Figure 4:
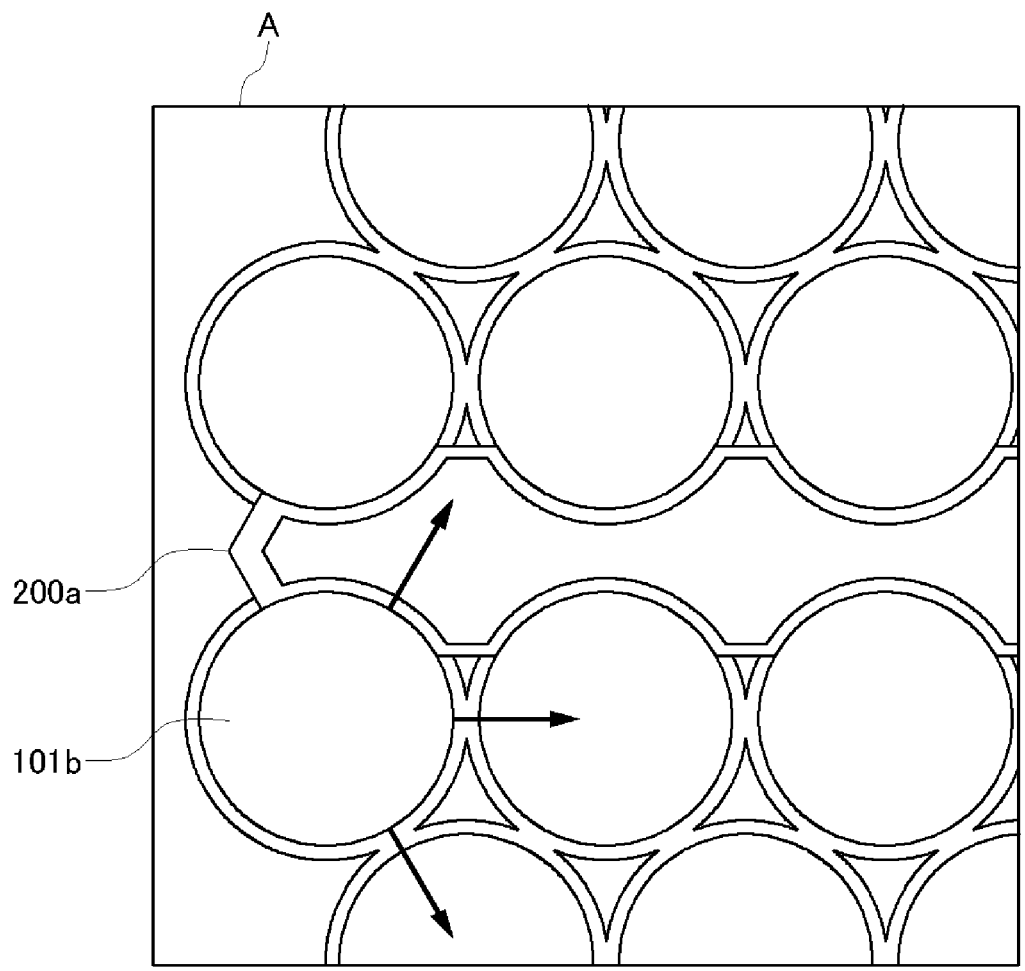
FIG. 4 is an enlarged view of region A of FIG. 3.

FIG. 4 is an enlarged view of region A of FIG. 3. If a first unit cell 101b of the second battery block 100b generates abnormal heat, the heat is propagated to the first battery block 100a via the first spacer 200a as well as to the second battery block 100b. By propagating the heat over an extensive range, heat dissipation of the unit cell generating abnormal heat is promoted. By using the same material for the spacer 200 and the accommodation member 150 of each battery block 100, the spacer 200 and the accommodation member 150 will exhibit the same thermal conductivity so that heat can be propagated uniformly.

Since the spacer 200 is hollow, the cooling air flows through the spacer 200, thereby efficiently cooling the unit cell generating abnormal heat. Because the cooling air flows between the battery blocks 100 during normal operation as well, the temperature of the battery blocks 100 is prevented from increasing. In applications where severe temperature management of the battery module 500 is required (e.g., on-vehicle applications), a fan for feeding cooling air to the spacer 200 may be installed in the neighborhood of the battery module 500.

Figure 5:
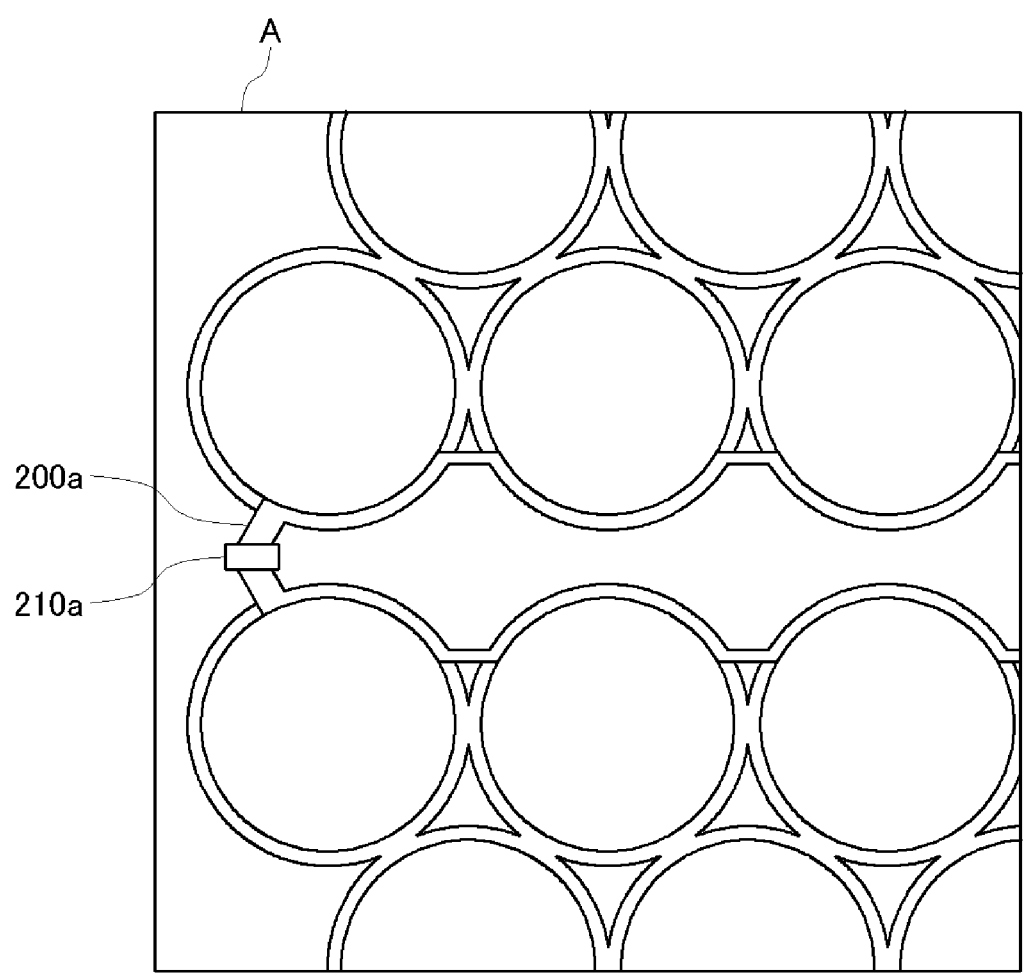
FIG. 5 shows a battery module according to a variation.

FIG. 5 shows the battery module 500 according to a variation. In this variation, the spacer 200 is formed to include an insulation member for insulating the two joined battery blocks 100 from each other. In the example shown in FIG. 5, an insulation member 210 is sandwiched in each of the two lateral surfaces joining the joint surface of the first spacer 200a joined to the first battery block 100a and the joint surface of the first spacer 200a joined to the second battery block 100b, so as to insulate the joint surfaces from each other. The insulation member 210 may be made of a resin material. In this case, the spacer 200 may be formed by insert molding using a metal material and a resin material. The entirety of the spacer 200 may be made of a resin with high rigidity.

If the first battery block 100a and the second battery block 100b are electrically connected in series as described above, a potential difference is created between the first battery block 100a and the second battery block 100b. The first battery block 100a and the second battery block 100b may be short-circuited for some reason and a large current may flow from one of the blocks to the other via the spacer 200. By sandwiching an insulation member in the spacer 200 as in this variation, a large current is prevented from flowing between the battery blocks 100 via the spacer 200.

As described above, the battery module 500 according to the embodiment provides packaging with high pyrogenic tolerance by joining the battery blocks 100 using the hollow spacer 200. By configuring one lateral surface of the spacer 200 to form a part of the accommodation member 150 of the unit cell located at the joint surface, the unit cell can be cooled more directly. Since the joint surface is arc-shaped, the unit cell can be cooled with a larger area than by using a flat shape. By using the spacer 200, which serves as a heat dissipation member and also as a joint member, packaging with high pyrogenic tolerance and high expandability is realized.

Described above is an explanation based on an exemplary embodiment. The embodiment is intended to be illustrative only and it will be obvious to those skilled in the art that various modifications to constituting elements and processes could be developed and that such modifications are also within the scope of the present invention.

The spacer 200 is described above as being made of aluminum but may be made of another metal material such as copper. The accommodation member 150 and the spacer 200 may be separately made of the same material or different materials. Alternatively, the accommodation member 150 and the spacer 200 may be made in one piece, using the same material.

The invention according to the embodiment may be defined by the following items.

[Item 1]

A battery module comprising:

a plurality of battery blocks formed by arranging a plurality of unit cells in each block; and a hollow spacer placed between two adjacent battery blocks.

[Item 2]

The battery module according to item 1, wherein the battery block includes an accommodation member having a plurality of cylindrical parts that accommodate the plurality of unit cells respectively, and the accommodation member and the spacer are made of a metal material.

[Item 3]

The battery module according to item 1 or 2, wherein the spacer is formed to include an insulation member for insulating two joined battery blocks from each other.

[Item 4]

The battery module according to item 1 or 3, wherein the battery block includes an accommodation member in which a plurality of cylindrical parts that respectively accommodate a plurality of columnar unit cells are arranged in a hexagonal lattice, a portion of the circumference of the cylindrical part on lateral surfaces of the accommodation member that should be joined to the spacer is opened, and the lateral surface of the spacer is wave-shaped so as to define a portion of the circumference of the accommodation member that is opened.

DESCRIPTION OF THE REFERENCE NUMERALS

500 battery module, 100 battery block, 150 accommodation member, 200 spacer, 210 insulation member

INDUSTRIAL APPLICABILITY

The present invention is applicable to on-vehicle secondary batteries and electricity storage systems.

The invention claimed is:

1. A battery module comprising:

a plurality of battery blocks formed by arranging a plurality of unit cells in each block; and a hollow spacer placed between two adjacent battery blocks, including an insulation member sandwiched between an upper portion of the hollow spacer adjacent to a one of the plurality of battery blocks and a lower portion of the hollow spacer adjacent to another of the plurality of battery blocks, such that the upper and lower portions of the hollow spacer are insulated from each other.

2. The battery module according to claim 1, wherein the battery block includes an accommodation member having a plurality of cylindrical parts that accommodate the plurality of unit cells respectively, and the accommodation member and the spacer are made of a metal material.

3. The battery module according to claim 1, wherein the spacer is formed to include an insulation member for insulating two joined battery blocks from each other.

4. The battery module according to claim 1, wherein the battery block includes an accommodation member in which a plurality of cylindrical parts that respectively accommodate a plurality of columnar unit cells are arranged in a hexagonal lattice, a portion of the circumference of the cylindrical part on lateral surfaces of the accommodation member that should be joined to the spacer is opened, and the lateral surface of the spacer is wave-shaped so as to define a portion of the circumference of the accommodation member that is opened.

* * * * *